United States Patent
Kim-Habermehl et al.

(10) Patent No.: US 9,169,382 B2
(45) Date of Patent: Oct. 27, 2015

(54) CARBOXYL GROUP CONTAINING ACRYLIC RDP AND DRY MIX CEMENT FORMULATIONS CONTAINING THEM

(71) Applicants: Dow Global Technologies LLC, Midland, MI (US); Rohm and Haas Company, Philadelphia, PA (US)

(72) Inventors: Linda Kim-Habermehl, Midland, MI (US); Mark D. Westmeyer, Collegeville, PA (US)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 14/383,586

(22) PCT Filed: Mar. 5, 2013

(86) PCT No.: PCT/US2013/029024
§ 371 (c)(1),
(2) Date: Sep. 8, 2014

(87) PCT Pub. No.: WO2013/134208
PCT Pub. Date: Sep. 12, 2013

(65) Prior Publication Data
US 2015/0111995 A1    Apr. 23, 2015

Related U.S. Application Data

(60) Provisional application No. 61/608,845, filed on Mar. 9, 2012, provisional application No. 61/665,994, filed on Jun. 29, 2012.

(51) Int. Cl.
| | |
|---|---|
| *C04B 24/26* | (2006.01) |
| *C08L 51/00* | (2006.01) |
| *C04B 28/06* | (2006.01) |
| *C04B 28/14* | (2006.01) |
| *C08F 265/06* | (2006.01) |
| *C04B 103/00* | (2006.01) |
| *C04B 111/00* | (2006.01) |

(52) U.S. Cl.
CPC ......... *C08L 51/003* (2013.01); *C04B 24/2641* (2013.01); *C04B 24/2652* (2013.01); *C04B 28/06* (2013.01); *C04B 28/065* (2013.01); *C04B 28/14* (2013.01); *C08F 265/06* (2013.01); *C04B 2103/0057* (2013.01); *C04B 2103/0058* (2013.01); *C04B 2103/0065* (2013.01); *C04B 2111/00672* (2013.01); *C08L 2205/24* (2013.01); *C08L 2207/53* (2013.01)

(58) Field of Classification Search
CPC  C08L 51/003; C08L 2207/53; C08L 2205/24
USPC ......... 524/306, 314, 315, 366, 369, 375–378, 524/459, 503, 504; 526/80, 81, 202, 209, 526/213
See application file for complete search history.

(56) References Cited

U.S. PATENT DOCUMENTS

| | | |
|---|---|---|
| 4,916,171 A | 4/1990 | Brown et al. |
| 5,403,894 A | 4/1995 | Tsai et al. |
| 5,519,084 A | 5/1996 | Pak-Harvey et al. |
| 5,606,015 A | 2/1997 | Chiou et al. |
| 5,739,179 A | 4/1998 | Chiou et al. |
| 5,744,540 A | 4/1998 | Baumstark et al. |
| 5,753,036 A | 5/1998 | Hornaman et al. |
| 5,872,189 A | 2/1999 | Bett et al. |
| 6,224,981 B1 | 5/2001 | Richard et al. |
| 6,288,174 B1 | 9/2001 | Ikegami et al. |
| 6,423,805 B1 | 7/2002 | Bacho et al. |
| 6,429,251 B2 | 8/2002 | Mayer et al. |
| 6,617,387 B2 | 9/2003 | Dreher et al. |
| 6,765,072 B1 | 7/2004 | Willimann et al. |
| 6,869,987 B2 | 3/2005 | Mills et al. |
| 7,012,114 B2 | 3/2006 | Bett et al. |
| 7,674,860 B2 | 3/2010 | Willimann et al. |
| 7,744,694 B2 | 6/2010 | Weitzel et al. |
| 7,803,225 B2 | 9/2010 | Zhang et al. |

(Continued)

FOREIGN PATENT DOCUMENTS

| | | |
|---|---|---|
| CN | 1951858 A | 4/2007 |
| CN | 101555106 A | 10/2009 |

(Continued)

OTHER PUBLICATIONS

Wang et al., "Formation of hydrates of calcium aluminates in cement pastes with different dosages of SBR powder," Construction and Building Materials 25, 2011, pp. 726-741.

(Continued)

*Primary Examiner* — Vu A Nguyen

(74) *Attorney, Agent, or Firm* — Andrew E. C. Merriam

(57) ABSTRACT

The present invention provides water redispersible polymer powder (RDP) compositions that perform well even when redispersibility is fair comprising carboxyl group containing multi-stage acrylic copolymers having an alkali-soluble resin outer stage and one or more inner stage acrylic (co)polymer having a glass transition temperature (Tg) of from −40 to 50° C., one or more nucleating agent having a boiling point of 150° C. to 500° C., and a water solubility of 3.5% or less, preferably, an alkyl isobutyrate and a branched alkyl isobutyrate, and one or more colloidal stabilizer. Also provided are dry mix cement tile adhesive compositions comprising the water redispersible polymer powder an ordinary Portland cement, an alumina rich cement with an alumina content of from 30 wt. % to 85 wt. %, and calcium sulfate. The invention enables a broad range of the claimed acrylic polymers in useful RDPs.

10 Claims, No Drawings

(56) References Cited

U.S. PATENT DOCUMENTS

| | | |
|---|---|---|
| 2007/0037925 A1 | 2/2007 | Weitzel et al. |
| 2007/0074642 A1 | 4/2007 | Amathieu et al. |
| 2007/0112117 A1 | 5/2007 | Weitzel |

FOREIGN PATENT DOCUMENTS

| | | |
|---|---|---|
| CN | 101648797 A | 2/2010 |
| CN | 101913827 A | 12/2010 |
| CN | 102140026 A | 8/2011 |
| CN | 102173711 A | 9/2011 |
| EP | 0758658 A2 | 2/1997 |
| EP | 812863 A1 | 12/1997 |
| FR | 2943665 A1 | 10/2010 |
| WO | 9715616 A1 | 5/1997 |

OTHER PUBLICATIONS

Wang et al., "Influence of polymer on cement hydration in SBR-modified cement pastes," Cement and Concrete Research 36, 2006, pp. 1744-1751.

Wang et al., "Physical and mechanical properties of styrene-butadiene rubber emulsion modified cement mortars," Cement and Concrete Research 35, 2005, pp. 900-906.

Wang et al., "Effect of Styrene—Butadiene Rubber Latex / Powder on the Formation of Cement Hydrates," Journal of the Chinese Ceramic Society, vol. 36, No. 7. Jul. 2008, pp. 912-926.

S. M. Thaker et al., "Synthesis and Spray Drying of Water-Redispersible Polymer," Drying Technology, 28: 2010, pp. 669-676.

CARBOXYL GROUP CONTAINING ACRYLIC RDP AND DRY MIX CEMENT FORMULATIONS CONTAINING THEM

The present invention relates to water redispersible polymer powders (RDPs) comprising acrylic copolymers having carboxyl groups. In particular, the present invention relates to water redispersible polymer powders comprising a carboxyl group containing multi-stage acrylic copolymer having an alkali-soluble resin outer stage and one or more inner stage and one or more nucleating agent wherein when dispersed in water the one or more inner stage comprises an acrylic (co) polymer having a glass transition temperature (Tg) of from −40 to 50° C., as well as to cement tile adhesive (CTA) compositions containing the same and methods of using the CTAs.

In construction applications, mortars have often been prepared with cement, sand, cellulose ether, and organic polymer. To reduce shipping costs, the polymer can be shipped and added in dry form, i.e. as a water-redispersible powder (RDP) in dry mix formulations to which water is added at the job site. Such powders can improve the adhesion and flexibility of cement containing tile adhesives (CTAs) and other cementitious materials. As documented in a recent study conducted by the TCNA (Tile Council of North America), CTA producers often struggle to meet the American National Standards for the Installation of Ceramic Tile (ANSI) specifications for water immersion shear strength. RDP additives can help CTA producers meet such specifications. However, the cost in use of any such RDP containing cementitious materials must remain competitive with materials currently available on the market before they will be adopted by a significant number of users.

U.S. Pat. No. 5,872,189 to Bett et al. discloses water-redispersible powders of film-forming polymers with a core/shell structure comprising a comprising a hydrophobic core based on a polymer exhibiting a Tg (glass transition temperature) of between −30° and +25° C., preferably between −10° and +20° C., and a hydrophilic shell based on a polymer exhibiting a Tg higher than +55° C., preferably higher than +90° C., characterized in that the shell is bonded to the core by covalent bonds resulting from the reaction of an agent for grafting the shell onto the ethylenic unsaturations remaining in the core (graftlinker), and is substantially insoluble in an alkaline medium. The Bett et al. water-redispersible powders may provide improved wet and dry binding binder power and weatherability. However, the graftlinking process to make the Bett et al. core-shell polymers is costly and complex, requiring separate synthesis in solvent of a block polymer having a reactive end group using a costly disulphide containing graftlinker followed by emulsion polymerization with added monomers to make the core-shell copolymer. Bett et al. evaluate redispersibility in water at various pHs and find only the most redispersible of the powders acceptable; those powders have the highest amount of acid in the shell and pose a potential storage stability problem as they may be water sensitive.

The present invention solves the problem of providing an acrylic water redispersible powder with having good to excellent performance in use even if they have marginal or acceptable water redispersibility, thereby decoupling polymer selection from water redispersibility and providing a broader polymer formulation window for useful acrylic water redispersible powders than is currently known in the art.

SUMMARY OF THE INVENTION

In accordance with the present invention, water redispersible polymer powders comprise a carboxyl group containing multi-stage acrylic copolymer having an alkali-soluble resin outer stage and one or more inner stage, one or more nucleating agent having a boiling point of 150° C. to 400° C., preferably, 200° C. or higher, and a water solubility of 3.5% or less, preferably, 1.0% or less, or, more preferably, 0.5% or less, and one or more colloidal stabilizer, preferably a polyvinyl alcohol (PVOH), wherein when dispersed in water the one or more inner stage comprises an acrylic (co)polymer having a glass transition temperature (Tg) of from −40 to 50° C., or, preferably, from −10 to 25° C., or more preferably, from 5 to 20° C. The total amount of the multi-stage acrylic copolymer and nucleating agent may range from 40 to 99.9 wt. %, based on the total weight of the water redispersible polymer composition, or, preferably, from 50 to 96.9 wt. %, or, more preferably, from 65 to 90 wt. %; and the total amount of colloidal stabilizer may range from 0.1 to 30 wt. %, or, preferably, from 2 to 4 wt. %. The total amount of nucleating agent in the multi-stage acrylic copolymer may range from 0.1 to 4.0 wt. %, based on the total polymer solids, or, preferably, from 0.5 to 3.0 wt. %, or, more preferably, from 1.0 to 2.0 wt. %. The water redispersible polymer powders may further comprise one or more anti-caking agent such that the total amount of the anti-caking agent ranges from 3.0 to 30 wt. %, based on the total weight of the water redispersible polymer composition, or, preferably, from 8.0 to 15.0 wt. %.

The water redispersible polymer powders of the present invention comprise carboxyl group containing multi-stage acrylic copolymers having in copolymerized form from 0.1 to 20 wt. %, based on the total weight of the monomers used to make the copolymer, of one or more carboxyl group containing monomer or, preferably, from 1.0 to 5.0 wt. %, or, more preferably, from 2.0 to 3.5 wt. %. Preferably, the water redispersible polymer powders comprise one or more colloidal stabilizer and are preferably formed in the presence of the one or more colloidal stabilizer.

The average particle size of the carboxyl group containing acrylic water redispersible polymer powders of the present invention may range from 50 to 500 nm, or, preferably, up to 400 nm, or, more preferably, from 60 to 350 nm especially for use in cement tile adhesives.

In the carboxyl group containing acrylic water redispersible polymer powders of the present invention, the proportion of alkali soluble resin may range from 5 to 30 wt. %, based on total polymer solids, or, preferably, up to 20 wt. %. Where the polymer itself is made using thermal initiators, the proportion of alkali soluble resin preferably ranges from 10 to 20 wt. %, or, more preferably, from 12 to 18 wt. %; where the polymer itself is made using a redox initiator pair, the proportion of alkali soluble resin preferably ranges from 5 to 15 wt. %, or, more preferably, from 5 to 12 wt. %.

In another aspect of the present invention, dry mixes comprise the water redispersible polymer powders (RDP) of the present invention, an ordinary Portland cement, an alumina rich cement with an alumina content of from 30 wt. % to 85 wt. %, preferably greater than 40 wt. %, more preferably greater than 55 wt. %, most preferably at least 70 wt. %, and calcium sulfate.

In the water redispersible polymer powders of the present invention, the multi-stage acrylic copolymers form a core/shell structure in water with the alkali soluble resin stage on the outside of the polymer particle either as a result of grafting or physiadsorption. Thus, the carboxyl groups in the copolymer are located at the surface of the redispersible copolymer powder particles. The nucleating agent helps to insure coverage of the inner stage(s) of the multi-stage acrylic copolymer particle with the alkali soluble resin and, thus, improves the colloidal stabilization of the core. In addition, reducing or eliminating the surfactant from production of the multi-stage acrylic copolymer used to produce the acrylic water redispersible polymer powders, enables a relatively larger particle size alkali soluble resin which helps colloidally stabilize the inner stages of the multi-stage acrylic copolymer in the powder. The resulting water redispersible powder exhibits a surprisingly high water immersion shear strength, % strength retention after water immersion, and a relatively fast set time in CTA applications when formulated into an alumina rich cement. For example, characterization according to test standard ANSI 118.4 section 5.2.3 (TCNA, 2011) shows that CTAs formulated with the carboxyl group containing multi-stage acrylic water redispersible polymer powders of the present invention, ordinary Portland cement, and a small amount of calcium aluminate cement and calcium sulfate exhibit superior 7 day water immersion impervious ceramic mosaic shear strength and dramatically shorter Vicat set times measured according to test standard ASTM C191 ((American Society for Testing and Materials 2008, ASTM International, West Conshohocken, Pa.) relative to the same mortars formulated with a carboxyl group multi-stage acrylic copolymer redispersible polymer powder that has no nucleating agent and a smaller average particle size.

Unless otherwise indicated, all temperature and pressure units are room temperature and standard pressure (STP). All ranges recited are inclusive and combinable.

All phrases comprising parentheses denote either or both of the included parenthetical matter and its absence. For example, the phrase "(meth)acrylate" includes, in the alternative, acrylate and methacrylate.

As used herein, the term "acrylic" refers to polymers that comprise the polymerization product of monomer mixtures containing more the 50 wt. %, based on total monomer solids, of any acrylic monomers, such as, for example, acrylates, methacrylates, (meth)acrylamides and (meth)acrylic acids.

As used herein, unless otherwise indicated, the phrase "average particle size", of a water redispersible polymer powder particle refers to the particle diameter or the largest dimension of a particle in a distribution of powder particles as determined by laser light scattering such that 50 wt. % of the particles in the distribution are smaller than the particle and 50 wt. % of the particles in the distribution are larger than the particle. For redispersed particles, the particle size distribution was measured using a Coulter™ LS 230 particle size analyzer (Beckman Coulter, Brea, Calif.) per manufacturer's recommended Procedures via laser scattering. The scattering light from particles through laser scattering and polarization intensity differential scattering is collected as a function of angle, and subsequently converted to a particle size distribution.

As used herein, unless otherwise indicated, the term "average particle size" for latex or emulsion particles refers to a weight average particle size measured via dynamic light scattering using a Brookhaven Instruments Corporation 90PLUS™ Particle Size Analyzer (Holtsville, N.Y.) per manufacturer's recommendations.

As used herein, the term "carboxylation level" refers to the total amount of carboxyl group containing material in a water redispersible polymer powder, based on total solids weight, and may include one or all of carboxyl group containing monomers used to make any polymers used in the powder, and carboxyl group containing additives, such as citric or adipic acid.

As used herein, the term "glass transition temperature" or "Tg" is the temperature measured using differential scanning calorimetry or DSC with a rate of heating 10° C. per minute, the Tg taken as the midpoint of the inflection.

As used herein, unless otherwise indicated, the phrase "molecular weight" refers to the weight average molecular weight as measured by gel permeation chromatography (GPC) against a poly(styrene) standard.

As used herein, the term "polymer" refers, in the alternative, to a polymer made from one or more different monomer, such as a copolymer, a terpolymer, a tetrapolymer, a pentapolymer etc., and may be any of a random, block, graft, sequential or gradient polymer. Thus, the term "polymer" includes copolymers and polymers within its scope.

As used herein, the term "substantially free of surfactants" means a composition that contains less than 5000 ppm of surfactant, based on the total weight solids of the composition, or, preferably, less than 2500 ppm.

As used herein, the term "water solubility" refers to the amount of a given material that visibly dissolves in water at room temperature, expressed as a percentage of the total weight or mass of water used. So, for example, if 5 grams of a material would dissolve in 100 g of water, the water solubility of that material is 5%.

As used herein, the phrase "wt. %" stands for weight percent.

The water redispersible polymer powders of the present invention may comprise other polymers blended with the carboxyl group containing acrylic multi-stage acrylic copolymer. Such other polymers may be, for example, any nonionic (co)polymer, such as a polyolefin, olefin-vinyl ester, for example, ethylene-vinyl acetate, alkyl (meth)acrylates, styrene, or styrene acrylic copolymers. The blends may comprise from 20 to 80 wt. %, or, preferably, from 30 to 70 wt. % or, more preferably, up to 60 wt. % of the nonionic (co) polymer, based on total polymer solids in the water redispersible polymer powder.

The water redispersible polymer powders of the present invention may comprise polymers that are the addition copolymerization product of from 0.001 to 5 wt. %, based on the total weight of monomers used to make the copolymer, or, preferably, 0.1 to 1.0 wt. % of a silyl group containing monomer, such as γ-methacryloyloxypropyl trialkoxy silane or vinyl trialkoxy silanes.

The multi-stage acrylic copolymers of the present invention are emulsion copolymers produced using conventional emulsion copolymerization, such as is described in U.S. Pat. No. 5,403,894 to Tsai et al., except that copolymerization to form the alkali soluble resin takes place in the presence of the nucleating agent of the present invention and, preferably, in a polymerization mixture that is substantially free of surfactants. Conventional thermal polymerization initiators, such as persulfate salts, and redox initiators, such as peroxides with bisulfite salts may be used.

In general, two copolymerization techniques may be used; and all but one polymerization stage comprises a polyfunctional monomer to chemically graft together the polymer stages. Technique one comprises emulsion copolymerization of a monomer mixture of an ethylenically unsaturated carboxylic acid or anhydride and one or more nonionic monomer, such as an alkyl (meth)acrylate, styrene, alkyl substituted styrene, (meth)acrylamide, or hydroxyalkyl (meth) acrylate, in the presence of a polyfunctional monomer to form an alkali soluble resin, neutralizing the alkali soluble resin with an amine or base and, in a second stage, forming a monomer mixture of one or more nonionic monomer, combining the second-stage monomers with the alkali soluble resin and polymerizing the monomer mixture to form the copolymers of the present invention. In one variation of this technique, the polyfunctional monomer is part of the second stage monomer mixture, not the monomer mixture that forms the alkali soluble resin, and is polymerized in the presence of the neutralized alkali soluble resin to form the inner stage polymer. Another technique, as in U.S. Pat. No. 4,916,171, comprises emulsion polymerizing a monomer mixture of one or more nonionic monomer in the presence of a polyfunctional monomer to form an inner stage polymer and, in a second or final stage, forming a monomer mixture of an ethylenically unsaturated carboxylic acid or anhydride and one or more nonionic monomer and combining the monomer mixture with the inner stage and polymerizing the mixture to form the copolymer. So long as there is one alkali soluble resin stage, additional nonionic monomer stages may be copolymerized in along with the addition of a polyfunctional monomer to make multi-stage copolymers. In polymerization, the temperature in each stage may range from 20 to 105° C., or, preferably, from 50 to 95° C. The resulting weight ratio of the total solids of the one or more nonionic or inner stage copolymers to the alkali soluble resin polymer may range from 95:05 to 60:40, or, preferably 90:10 to 70:30, or, more preferably, from 85:15 to 75:25. In any polymerization, the initial stage may be formed by seed polymerization according to conventional methods.

Nucleating agents for use in the present invention may be any compounds having a boiling point of 150° C. to 400° C. and a water solubility of 3.5% or less. To insure that it will be in the water redispersible polymer powder product, the nucleating agent should not be volatile under processing conditions. Such nucleating agents may be chosen from $C_3$ to $C_{10}$ alkyl glycol ethers; phenyl glycol ethers, such as ethylene glycol phenyl ether; $C_3$ to $C_{10}$ alkyl diglycol ethers, such as dipropylene glycol n-butyl ether; $C_3$ to $C_{10}$ alkylaryl glycol ethers, such as ethylene glycol octylphenyl ether; $C_3$ to $C_{10}$ alkylaryl diglycol ethers, such as dipropylene glycol butylphenyl ether; $C_3$ to $C_{10}$ alkyl esters of $C_3$ to $C_9$ alkanoic acids, such as alkyl isobutyrates and branched alkyl isobutyrates, like 2,2,4-trimethyl-1,3-pentanediol monoisobutyrate; $C_3$ to $C_{10}$ alkyl esters of $C_3$ to $C_9$ alkanedioic acids, such as butyl succinate; $C_3$ to $C_{10}$ alkyl diesters of $C_3$ to $C_9$ alkanoic acids, such as 2,2-dimethyl-1-methylethyl-1,3-propanediylbis-2-methyl propionate; and $C_3$ to $C_{10}$ dialkyl esters of $C_3$ to $C_9$ alkanedioic acids, such as diisobutyl glutarate, diisobutyl succinate, diisobutyl adipate; and mixtures thereof, preferably, alkyl and branched alkyl isobutyrates. Suitable amounts of such nucleating agents may range from 0.5 to 3.0 or, preferably, from 1.0 to 2.0. The nucleating agents are preferably included in copolymerization in the first stage or prior to or during polymerizing to form the alkali soluble resin stage. Nucleating agents are preferably used instead of surfactants in copolymerization to improve redispersibility. Examples of some nucleating agents are shown in Table 1.0, below.

Preferably, to avoid use of excess surfactant, polymerization may be carried out in the presence of a colloidal stabilizer in the amount of from 0.05 to 15 wt. %, based on the total weight of monomer solids, or, preferably, 0.1 to 10 wt. %, or, more preferably, from 1 to 4 wt. %. In addition, conventional chain transfer agents or mixtures thereof, such as $C_1$-$C_6$ alkyl and alkyloxy mercaptans, can be employed to control molecular weight. The amount of such colloidal stabilizers used in polymerization may provide all of the colloidal stabilizer that is needed to make a suitable dry water redispersible polymer powder.

TABLE 1.0

Nucleating Agents

| Nucleating Agent | BP (° C.) | $H_2O$ Solubility* |
|---|---|---|
| 2,2-dimethyl-1-methylethyl-1,3-propanediyl bis-2-methyl propionate | 344 | Negligible |
| diisobutyl glutarate (55-65%); diisobutyl succinate (15-25%); diisobutyl adipate (10-25%) | 274-289 | Negligible |
| ethylene glycol phenyl ether (DALPAD ™,[1] A) | 244 | 2.5% |
| ethylene glycol phenyl ether (DOWANOL ™,[1] EPh) | 244 | 3.1% |
| 2,2,4-trimethyl-1,3-pentanediol monoisobutyrate | 254 | 0.1% |
| propylene glycol phenyl ether | 243 | 2.0% |
| dipropylene glycol n-butyl ether | 230 | 4.5% |
| ethylene glycol octylphenyl ether | 250 | Negligible |

[1]Dow Chemical Co., Midland, MI

Suitable nonionic monomers for the preparation of the multi-stage acrylic copolymers may be chosen from ethyl acrylate, butyl acrylate, 2-ethylhexyl acrylate, methyl methacrylate, ethyl methacrylate, butyl methacrylate, methylolated (meth)acrylamide and methyl methacrylamide, hydroxyethyl (meth)acrylate. Nonionic monomers should not comprise more than 5 wt. % of hydroxyalkyl or methylolated monomers or amide group containing monomers. The ordinary skilled artisan knows how to select nonionic monomers so as to give a polymer stage having a desired Tg.

Suitable polyfunctional monomers may be from (a) multi-ethylenic monomers having two or more sites of unsaturation, such as, for example, allyl-, methallyl-, vinyl-, dicylopentenyl and crotyl-esters of acrylic, and methacrylic acids, divinyl benzene, (poly)glycol di(meth)acrylates, such as, diethyleneglycol dimethacrylate; and polyol poly(meth)acrylates, such as trimethylolpropane trimethacrylate; (b) reactive chain transfer agents having two or more abstractable atoms, such as, for example, bromotrichloromethane; bromoform; carbon tetrachloride; and carbon tetrabromide; and (c) hybrid polyfunctional monomers having one or more sites of unsaturation and one or more abstractable atoms, such as, for example, allyl-, methallyl-, and crotyl-mercaptan; vinyl ethers and vinyl thioethers of cycloalkenols and cycloalkene thiols. Preferred polyfunctional monomers include allyl or methallyl (meth)acrylate, N-methallyl vinyl-amides of acrylic acid and methacrylic acid; and allyl-mercaptan. Useful amounts of polyfunctional monomers range from 0.01 to 5 wt. %, based on the total weight of monomers in the monomer mixture in which they are used, or, preferably, from 0.25 to 3.0 wt. %.

Suitable ethylenically unsaturated carboxylic acid or anhydride monomers for use in preparing the alkali soluble resin include, for example, acrylic acid, methacrylic acid, itaconic acid, maleic acid, fumaric acid, acrylic anhydride, methacrylic anhydride, half esters of maleic anhydride/fumaric/itaconic, maleic anhydride, and itaconic anhydride, preferably (meth)acrylic acid. The monomer mixture for forming the alkali soluble resin may comprise from 5 to about 40 wt. % of a carboxylic acid or anhydride monomer, or, preferably, from 15 to 35 wt. %.

Colloidal stabilizers suitable for use in the emulsion polymerization of the present invention may include, for example, polyvinyl alcohols (PVOH) of various known molecular weights and degrees of hydrolysis, e.g. partially hydrolyzed polyvinyl alcohols, chelating agents, such as, for example, ethylenediamine tetraacetate, polyacrylamides, polyvinylpyrrolidones, polysaccharides, polyvinyl sulfonic acid, cellulose, cellulose ethers, and polyesters, and blends of any of these. PVOH is preferred. In polymerization, useful amounts of colloidal stabilizers may range from 0.1 to 10.0 wt. % of the total monomer solids, preferably, from 0.5 to 5.00 wt. %. Anionic and non-ionic surfactants may be used in polymerization in amounts of less than 0.5 wt. % of the total water redispersible polymer powder solids.

The water redispersible polymer powders of the present invention may be formed by drying an aqueous mixture of the carboxyl group containing multi-stage acrylic copolymer and additional colloidal stabilizer, preferably polyvinyl alcohol (PVOH), and if desired one or more anti caking agent. The additional colloidal stabilizers are added in amounts so as to result in the desired total amounts of colloidal stabilizers in the water redispersible polymer powders. Preferably, drying the aqueous admixture comprises spray drying. Spray drying can be carried out in customary spray drying plants, with atomization being carried out by means of single-fluid, two-fluid or multifluid nozzles or a rotary disc atomizer. In general, air, nitrogen or nitrogen enriched air may be employed as the drying gas, the inlet temperature of the drying gas generally not exceeding 200° C., preferably from 110° C. to 180° C., more preferably from 140° C. to 170° C. The outlet temperature may generally be from 45° C. to 120° C., preferably from 60° C. to 90° C., depending on the plant, the Tg of the resin and the desired degree of drying. In one example, the viscosity of the feed to be spray-dried may be adjusted via the solids content so that a value of less than 1000 mPas (Brookfield viscosity at 20 rpm and 23° C.), preferably less than 250 mPas, is obtained. The solids content of the admixture to be spray-dried may generally be from 25% to 60% by weight, preferably from 35% to 50% by weight, based on the total weight of the dispersion.

Suitable colloidal stabilizers useful in drying to form the water redispersible polymer powders of the present invention may comprise any such compounds suitable for use in polymerization, as well as cellulose, cellulose ethers, polyesters, chelating agents, such as, for example, ethylenediamine tetraacetate, and blends of any of these. PVOH is preferred.

Suitable anti-caking agents useful in drying to form the water redispersible polymer powders of the present invention may include, for example, calcium carbonate, talc, dolomite, and silicate minerals. In addition, other conventional additives in conventional amounts may be used, including, for example, inorganic additives; actives for personal care, pharma, ag, or oil/gas, can be added prior to drying the aqueous admixture, such as an antifoaming agent in an amount of up to 1.5 wt. %, based on total solids. Other additives which may be employed, in conventional amounts, include one or more salts, such as $CaCl_2$, and $MgCl_2$, monosaccharides, disaccharides, dispersants or superplasticizers.

Preferably, to increase the water redispersibility of the water redispersible polymer powders, a basic compound can be added prior to substantially drying the aqueous copolymer dispersion. The basic compound may be added before, during or after polymerization in an amount of 0.4 moles or more, preferably from 0.5 to 2 moles, more preferably 0.6 moles or more per mole of carboxylic groups in the copolymer. The basic compound can be added in such an amount to adjust the pH of the aqueous copolymer product to 8.0 or more, or 9.5 or more, or, preferably at least 10.5, and preferably up to 12.5. The basic compound may be an inorganic basic compound, preferably a strong inorganic basic compound, such as an alkali metal hydroxide or an alkaline earth metal hydroxide, such as calcium hydroxide, magnesium hydroxide, sodium hydroxide or potassium hydroxide.

Preferably, in accordance with the present invention, cement containing tile adhesive (CTA) dry mixes comprise 25 to 45 wt. % of an ordinary Portland cement (OPC), based upon the weight of the dry mix composition, from 1 to 8 wt. %, preferably, from 2.5 to 5.5 wt. %, based upon the weight of the dry mix composition, of a high alumina content cement, or alumina rich cement, such as calcium aluminate cement (CAC) or calcium sulfoaluminate cement (CSA), calcium sulfate in an amount of from 40 to 60 wt. %, for example, 45 to 55 wt. %, based upon the weight of the calcium aluminate cement, from 40 to 70 wt. % of quartz sand, preferably having a particle size of from 0.1 mm to 0.5 mm, as the main filler, and from 0.1 to 10 wt. %, preferably 1 to 6 wt. % of the water redispersible polymer powder of the present invention. The high alumina content cement, such as calcium aluminate cement has an alumina ($Al_2O_3$) content of greater than 30 wt. %, preferably greater than 40 wt. %, more preferably greater than 55 wt. %, most preferably at least 70 wt. %, based upon the weight of the high alumina content cement. The cement containing dry mix compositions may also include fillers and other conventional additives in conventional amounts, such as, for example, alkali metal hydroxide and/or alkaline earth metal hydroxide selected from the group consisting of zinc oxide, zinc hydroxide, and zinc hydroxide carbonate, an accelerator such as lithium carbonate, tartaric acid, one or more thickener such as a cellulose ether, such as hydroxymethylcellulose, a defoamer, and a liquefier, dispersant, or superplasticizer, such as a water soluble co-polymer dispersant, such as MELFLUX™ 2651F, a modified polycarboxylate (BASF Construction Polymers, Kennesaw Ga.). Examples of fillers include, for example, sand such as silica sand and quartz sand, quartz flour, calcium carbonate, dolomite, aluminum silicates, talc or mica, or light weight fillers such as pumice, foamed glass, aerated concrete, perlites or vermiculites. Mixtures of the fillers may also be included. Suitable high alumina content cements may include commercially available calcium aluminate cements (CAC), such as Ternal™ W, a CAC with an alumina content of approximately 70 wt. %, produced by Kerneos SA, France, and calcium sulfoaluminate cements (CSA), such as produced by Tangshan Polar Bear Cement Company, Ltd, Hebei Province, China. Suitable sources of calcium sulfate may be anhydrite or gypsum, setting forms (hemi-hydrate), and drying forms (dihydrate), and mixtures thereof.

As used herein, the term "water redispersible polymer powder" means a powder which may be readily dispersed into deionized water to provide a particle size distribution of the original particle size of the latex or emulsion polymer used to make the redispersible polymer powder.

Unless otherwise indicated, all parts and percentages are by weight, all temperatures are at room temperature, and all pressures are at standard pressure.

As shown in Table 1.1, below, the following materials were used in to make the multi-stage acrylic copolymers in the Examples:

TABLE 1.1

Materials

| Name | Composition and Source |
|---|---|
| CELVOL ™,2 203 Solution | polyvinyl alcohol (MW 18,000, 88% deg. hydrolysis) |
| COASOL ™,1 Di-Ester | diisobutyl glutarate (55-65%); diisobutyl succinate (15-25%); diisobutyl adipate (10-25%) |
| DOWANOL ™,1 EPh or DALPAD ™,1 A | ethylene glycol phenyl ether |
| DOWANOL ™,1 PPh | propylene glycol phenyl ether |
| DOWANOL ™,1 DPnB | dipropylene glycol n-butyl ether $C_4H_9O[CH_2CH(CH_3)O]_2H$ (major isomer) |
| MOWIOL ™,3 4-88 Solution | polyvinyl alcohol (86.7 to 88.7% hydrolyzed, $M_W$~31K (20 wt. %) |
| OPTIFILM ™,4 400 | 2,2-dimethyl-1-methylethyl-1,3-propanediyl bis-2-methyl propionate |
| PLURONIC ™,5 L-31 | ethylene oxide-propylene oxide-ethylene oxide block copolymer |
| SURFYNOL ™,6 104 | 2,4,7,9-tetramethyl-5-decyn-4,7-diol |
| TEXANOL ™,4 | 2,2,4-trimethyl-1,3-pentanediol monoisobutyrate |
| TERNAL W ™,9 | calcium aluminate cement (Al2O3 68.7-70.5%; CaO 28.5-30.5%; SiO2 0.2-0.6%; Fe2O3 0.1-0.2%) |
| TRITON ™,1 X-15 | ethylene glycol octylphenyl ether; HLB = 1.5 |
| TRITON ™,1 CF-10 | Nonionic surfactant; HLB = 12.6 |
| TRITON ™,1 X-100 | octylphenol polyethoxylate Nonionic surfactant; HLB = 13.4 |
| TRITON ™,1 X-405 | polyethylene glycol octylphenyl ether; HLB = 17.6 |
| VERSENE ™,1 | EDTA, tetrasodium salt |
| WINNOFIL ™,8-S | $CaCO_3$ coated with stearic acid |

[1]Dow Chemical Co., Midland, MI;
[2]Celanese Corp., Dallas, TX;
[3]Kuraray America, Inc, Houston, TX;
[4]Eastman Chemical, Kingsport, TN;
[5]BASF Ag Florham Park, NJ;
[6]Air Products, Inc., Allentown, PA;
[8]Solvay Advanced Functional Materials, Houston, TX
[9]Kerneos SA, Neilly sur Seine, FR.

SYNTHESIS EXAMPLES

Emulsions 1-14, below, were made by an inverse two-stage process (alkali soluble resin is prepared first followed by polymerization of the inner stage copolymer in the presence of the alkali soluble resin). Emulsions 13 to 14, below, were made using redox initiators.

Emulsion 1

To a 20 L reactor equipped with a mechanical stirrer, thermocouple, condenser and a stainless steel feed ports was charged and warmed to 85° C. 1933 gm of deionized (DI) water. When warm, a monomer emulsion (ME) as shown in Table 2.1, below, was transferred with a FMI (Fluid Meter Incorporated, Syosset, N.Y. pump at its maximum rate into the reactor over ~15 minutes. An additional 159 gm DI water rinse was then added to the reactor. With the reactor temperature at 50° C., three separate aqueous solutions of sodium sulfoxylate formaldehyde (SSF), tert-butylhydroperoxide (tBHP) and ferrous sulfate heptahydrate, as shown in Table 2.1, below, were added sequentially to the reactor. An exothermic reaction was observed within 2-3 minutes, gradually increasing to 90° C. over 15 minutes. After the temperature peaked, two aqueous chaser solutions composed of tBHP and SSF were added to the reactor to reduce residual monomer. After 10 minutes, an aliquot was taken and analyzed for 434 nm (BI90 plus), 434 ppm MMA, and pH 2.19. The resulting latex was next treated with a neutralizer solution composed of aqueous solution of sodium hydroxide and calcium hydroxide to afford slightly soluble copolymer with a semi-transparent solution and a pH 11.

After 15 minutes, as shown in Table 2.2, below, an aqueous ammonium persulfate (APS) initiator solution was added followed the gradual addition of monomer emulsion 2 (ME2) and an aqueous ammonium persulfate solution (cofeed initiator solution) at 124.8 and 9.57 g/min, respectively. Total feed time was 80 minutes and the reaction temperature was maintained between 84-86° C. After these feeds were completed, 159 gm of DI Water was used to rinse the ME2 to the reactor and 20 gm of DI Water was used to rinse the cofeed initiator to the reactor. While these rinses were being fed to the reactor, the latex was cooled to 75° C. An aqueous solution of tBHP and SSF were feed to the latex over 20 minutes while cooling the latex to 50° C. At 50° C., a biocide (ROCIMA BT2S, Dow Chemical, Midland, Mich.) was added to the latex and the latex was isolated and analyzed: 47.28%% Solids; pH 7.56: 174 nm average particle size (BI90 plus), 35 ppm MMA and 58 ppm BA.

TABLE 2.1

| ME | Wt (gm) |
|---|---|
| DI water | 1525 |
| EDTA, tetrasodium salt | 0.183 |
| sodium dodecylbenzenesulfonate (NaDBS) | 4.77 |
| SURFYNOL ™ 104 | 125.1 |
| methyl methacrylate (MMA) | 981.0 |

TABLE 2.1-continued

| | |
|---|---|
| allyl methacrylate (ALMA) | 19.06 |
| glacial methacrylic acid (MAA) | 250.2 |
| methyl 3-mercapto propionate (MMP) | 43.69 |

| Solutions | | | | | | | | | | |
|---|---|---|---|---|---|---|---|---|---|---|
| Activator | Wt (gm) | Initiator | Wt (gm) | Promoter | Wt (gm) | Chase Activator | Wt (gm) | Chase Initiator | Wt (gm) | Neutralizer (Stage 1) | Wt (gm) |
| SSF DI Water | 15.89 151 | tBHP DI Water | 24.62 115 | FeSO$_4$—7H$_2$O DI Water | 0.095 61 | SSF DI Water | 1.79 99 | tBHP DI Water | 2.58 60 | DI Water sodium hydroxide (50 wt. % water) calcium hydroxide | 616 150.9 71.5 |

TABLE 2.2

Stage Two Materials

| ME2 | Wt (gm) | Initiator | Wt (gm) | Cofeed Initiator Solution | Wt (gm) |
|---|---|---|---|---|---|
| DI water | 879 | APS | 9.13 | APS | 42.89 |
| CELVOL ™ 203 solution (10% wt) | 2226.4 | DI WATER | 115 | DI water | 723 |
| sodium lauryl sulfate (SLS) | 50.0 | | | | |
| butyl acrylate (BA) | 3415.5 | | | | |
| MMA | 3415.5 | | | | |

Emulsion 2

Preparation of a graft copolymer composed of an alkali-soluble copolymer shell and a low Tg copolymer core. To a 20 L reactor equipped with a mechanical stirrer, thermocouple, condenser and a stainless steel feed ports 1933 gm of DI water and warmed to 85° C., monomer emulsion 1 (ME) summarized in Table 2.3, below was transferred into the reactor with an FMI pump at maximum rate over ~15 minutes. After ME1 had been transferred into the reactor, an additional 159 gm DI Water rinse was added to the reactor. With the reactor temperature at 50° C., three separate aqueous solutions composed of sodium sulfoxylate formaldehyde (SSF), tert-butylhydroperoxide (tBHP) and ferrous sulfate heptahydrate were charged sequentially to the reactor. An exothermic reaction was observed within 2-3 minutes gradually increasing to 88° C. over 20 minutes. After the temperature peaked, two aqueous chaser solutions composed of tBHP and SSF were added to the reactor to reduce residual monomer. After 10 minutes, an aliquot was taken and analyzed for 434 nm (BI90 plus), 434 ppm MMA, and pH 2.19. The resulting latex was treated with an aqueous neutralizer solution of sodium hydroxide and calcium hydroxide to afford slightly soluble copolymer with a semi-transparent solution and a pH 11.

TABLE 2.3

| ME | Wt (gm) |
|---|---|
| DI water | 1525 |
| EDTA, tetrasodium salt | 0.183 |
| NaDBS | 4.77 |
| TRITON ™ X-15 surfactant (Nucleating agent) | 125.1 |
| MMA | 981.0 |
| ALMA | 19.06 |
| MAA | 250.2 |
| MMP | 43.69 |

| Stage 1 Solutions | | | | | | | | | | | |
|---|---|---|---|---|---|---|---|---|---|---|---|
| Activator | Wt (gm) | Initiator | Wt (gm) | Promoter | Wt (gm) | Chase Activator | Wt (gm) | Chase Initiator | Wt (gm) | Neutralizer (Stage 1) | Wt (gm) |
| SSF DI water | 15.89 151 | tBHP DI water | 24.62 115 | FeSO$_4$—7H$_2$O DI water | 0.095 61 | SSF DI water | 1.79 99 | tBHP DI water | 2.58 60 | DI water sodium hydroxide (50% water) calcium hydroxide | 616 150.9 71.5 |

After 15 minutes, as shown in Table 2.4, below, an initiator solution was added followed the gradual addition of ME2 and cofeed initiator solution at 57.5 and 4.1 g/min, respectively. After 10 minutes, these feed rates were increased to 117.6 and 9.1 gm/min for the ME2 and cofeed initiator solution, respectively. Total feed time was 90 minutes and the reaction temperature was maintained between 84-86° C. After these feeds were completed, 159 gm of DI Water was used to rinse the ME#2 to the reactor and 20 gm of DI water was used to rinse the cofeed initiator to the reactor. While these rinses were being fed to the reactor, the latex was cooled to 75° C. An aqueous solution of tBHP and SSF were feed to the latex over 20 minutes while cooling the latex to 50° C. At 50° C., a biocide (ROCIMA BT2S) was added to the latex and the latex was isolated and analyzed: 48.21%% Solids; pH 7.54: 238 nm average particle size (BI90 plus), 2 ppm MMA, 15 ppm BA and 117 ppm MAA.

TABLE 2.4

Stage Two Materials

| ME2 | Wt (gm) | Initiator | Wt (gm) | Cofeed Initiator Solution | Wt (gm) |
|---|---|---|---|---|---|
| DI water | 1973 | APS | 9.13 | APS | 42.89 |
| MOWIOL ™ 4-88 Solution (20% wt) | 1131.4 | DI water | 115 | DI water | 723 |
| SLS | 50.0 | | | | |
| BA | 3415.5 | | | | |
| MMA | 3415.5 | | | | |

Emulsion 3

At ambient temperature, 640 gm of DI water was added to a 5-L, 4-neck round bottom flask equipped with a mechanical stirrer, thermocouple, condenser and a stainless steel diptube and was warmed to 85° C. ME1, shown in Table 2.5, below, was transferred into the flask over ~15 minutes. An additional 30 gm DI water rinse was added and the reaction mixture was let cool. With the reactor temperature at 48° C., three separate aqueous solutions composed of sodium sulfoxylate formaldehyde (SSF), tert-butylhydroperoxide (tBHP) and ferrous sulfate heptahydrate were sequentially charged to the flask. An exothermic reaction was observed within 2-3 minutes gradually increasing to 84° C. over 15 minutes. After the temperature peaked, two aqueous chaser solutions composed of tBHP and erythorbic acid were charged sequentially to the flask to reduce residual monomer. After 10 minutes, an aliquot was taken and analyzed to give an average particle size of 284 nm (BI90 plus), 122 ppm MMA, pH 2.46 and Mw of 8872 with a Mn 4903 (THF soluble). The resulting latex was next treated with a neutralizer solution composed of aqueous solution of sodium hydroxide and calcium hydroxide to afford slightly soluble copolymer with a semi-transparent solution and a pH 11.

After 30 minutes, the 114 gm of ME2, as shown in Table 2.6, below, was transferred to the reactor followed by the addition shot addition of the initiator solution. An exothermic reaction was observed (7° C.). After the temperature peaked, ME2 and the cofeed initiator solution were fed at 21.1 and 1.5 g/min, respectively. Total feed time was 90 minutes and the reaction temperature was maintained between 84-86° C. After these feeds were completed, 35 gm of DI Water was used to rinse residuals from the ME2 feed into the flask and 10 gm of DI Water was used to rinse the cofeed initiator to the flask. While these rinses were being fed to the flask, the latex was cooled to 75° C. An aqueous solution of tBHP and SSF were feed to the latex over 20 minutes while cooling the latex to 50° C. At 50° C., a biocide (ROCIMA BT 2S) was added to the latex and the latex was isolated and analyzed: 48.01%% Solids; pH 7.49: 155 nm average particle size (BI90 plus), 0 ppm MMA, 12 ppm BA and a Mw of 384,840 with a Mn 40.931.

TABLE 2.5

| ME1 | Wt (gm) |
|---|---|
| DI water | 570 |
| NaDBS | 1.40 |
| PLURONIC ™ L-31 | 36.9 |
| MMA | 304.7 |
| ALMA | 5.8 |
| MAA | 77.6 |
| MMP | 13.6 |

Stage 1 Solutions

| Activator | Wt (gm) | Initiator | Wt (gm) | Promoter | Wt (gm) | Chase Activator | | Chase Initiator | | Neutralizer (Stage 1) | Wt (gm) |
|---|---|---|---|---|---|---|---|---|---|---|---|
| SSF | 3.5 | tBHP | 5.6 | FeSO$_4$—7H$_2$O | 0.011 | erythorbic acid | 0.30 | tBHP | 0.60 | DI water | 115 |
| DI water | 35 | DI water | 30 | DI water | 10 | DI water | 32 | DI water | 35 | sodium hydroxide (50% water) | 36.3 |
| | | | | | | | | | | calcium hydroxide | 16.9 |

TABLE 2.6

Stage Two Mixtures

| ME2 | Wt (gm) | Initiator | Wt (gm | Cofeed Initiator Solution | Wt (gm |
|---|---|---|---|---|---|
| DI water | 405 | APS | 2.1 | APS | 7.1 |
| PLURONIC L-31 | 11.9 | DI water | 32 | DI water | 135 |
| SLS | 11.2 | | | | |
| BA | 790.7 | | | | |
| MMA | 759.2 | | | | |

Emulsion 4

(Comparative) At ambient temperature, 473 gm of DI water was added to a 5-L, 4-neck round bottom flask equipped with a mechanical stirrer, thermocouple, condenser and a stainless steel diptube and was warmed to 50° C., ME1, as shown in Table 2.7, below, was transferred to the flask over ~15 minutes. After ME1 had been transferred, three aqueous solutions composed of SSF, tBHP and ferrous sulfate were sequentially charged to the flask. An exothermic reaction was observed within 2-3 minutes gradually increasing to 90° C. over 15 minutes. After the temperature peaked, two aqueous solutions composed of tBHP and SSF were charged sequentially to the flask to reduce residual monomer. After 10 minutes, the latex was analyzed: average particle size of 372 nm (BI90 plus); 222 ppm MMA and pH 2.39. The resulting latex was next treated with a neutralizer solution composed of aqueous solution of sodium hydroxide and calcium hydroxide to afford slightly soluble copolymer with a semi-transparent solution and a pH 11.

Emulsion 5

The same process as in making Emulsion 4 was followed except that TRITON X-405 was used in place of SURFYNOL 104. Quantitative analysis (QA) Data: 47.76% solids; average particle size 136 nm (BI90 plus); and pH 7.44.

Emulsion 6

The same process as in making Emulsion 4 was followed except that PLURONIC L-31 was used in place of SURFYNOL 104. QA Data: 49.00%, average particle size 168 nm (BI90 plus); and pH 7.64.

TABLE 2.7

| ME1 | Wt (gm) |
|---|---|
| DI water | 373 |
| EDTA, tetrasodium salt | 0.045 |
| NaDBS | 1.17 |
| SURFYNOL ™ 104 | 30.6 |
| MMA | 240.0 |
| ALMA | 4.66 |
| MAA | 61.2 |
| MMP | 10.69 |

Stage 1 Solutions

| Activator | Wt (gm) | Initiator | Wt (gm) | Promoter | Wt (gm) | Chase Activator | Wt (gm) | Chase Initiator | Wt (gm) | Neutralizer (Stage 1) | Wt (gm) |
|---|---|---|---|---|---|---|---|---|---|---|---|
| SSF | 3.89 | tBHP | 6.02 | FeSO₄—7H₂O | 0.023 | SSF | 0.44 | tBHP | 0.63 | DI water | 151 |
| DI water | 37 | DI water | 28 | DI water | 15 | DI WATER | 15 | DI WATER | 24 | sodium hydroxide (50% water) | 36.9 |
|  |  |  |  |  |  |  |  |  |  | calcium hydroxide | 17.5 |

After 30 minutes, the initiator solution shown in Table 2.8, below, was charged to the flask followed the gradual addition of ME2 and a cofeed initiator solution at 30.5 and 2.34 g/min, respectively. Total feed time was 80 minutes and the reaction temperature was maintained between 84-86° C. After these feeds were completed, 39 gm of DI Water was used to rinse the ME2 feed line into the flask and 10 gm of DI Water was used to rinse the cofeed initiator into the flask. While these rinses were being fed to the flask, the latex was cooled to 75° C. Aqueous solutions of tBHP and SSF were separately fed to the latex over 20 minutes while cooling the latex to 50° C. At 50° C., a biocide (ROCIMA BT2S) was added to the latex and the latex was isolated and analyzed: 46.85% Solids; 155 nm average particle size (BI90 plus), pH 7.53, 64 ppm MMA and 93 ppm BA.

TABLE 2.8

Stage Two Materials

| ME2 | Wt (gm) | Initiator | Wt (gm) | Cofeed Initiator Solution | Wt (gm) |
|---|---|---|---|---|---|
| DI water | 537.8 | APS | 2.23 | APS | 10.49 |
| MOWIOL 4-88 Solution (25% wt) | 221.6 | DI water | 28 | DI water | 177 |
| SLS | 12.2 |  |  |  |  |
| BA | 835.5 |  |  |  |  |
| MMA | 835.5 |  |  |  |  |

Emulsion 7

The same process as in making Emulsion 4 was followed except that TRITON CF-10 was used in place of SURFYNOL 104. QA Data: 48.166%, average particle size 151 nm (BI90 plus), pH 7.21, 14 ppm MMA, 34 ppm BA and 147 ppm MAA.

Emulsion 8

The same process as in making Emulsion 4 was followed except that TRITON X-15 Surfactant was used in place of SURFYNOL 104. QA Data: 47.974%, average particle size 158 nm (BI90 plus), pH 7.33, 20 ppm MMA, 31 ppm BA and 295 ppm MAA.

Emulsion 9

The same process as in making Emulsion 4 was followed except that TRITON X-100 was used in place of SURFYNOL 104. QA Data: 48.24%, average particle size 172 nm (BI90 plus), pH 7.22, 0 ppm MMA and 178 ppm BA.

Emulsion 10

The same process as in making Emulsion 4 was followed except that TEXANOL was used in place of SURFYNOL 104. QA Data: 49.48% solids and 185 nm particle size (BI90 plus)

Emulsion 11

The same process as in making Emulsion 4 was followed except that TEXANOL was used in place of SURFYNOL 104 at 2× the concentration. QA Data: 48.71%, average particle size 188 nm (BI90 plus), pH 7.22, 3 ppm MMA and 8 ppm BA.

Emulsion 12

The same process as in making Emulsion 4 was followed except that TEXANOL was used in place of SURFYNOL 104 at 3× the concentration. QA Data: 48.80% solids, average particle size average particle size 203 nm (BI90 plus), 5 ppm MMA and 42 ppm BA.

Emulsion 13

The same process as in making Emulsion 3 was followed. QA Data: 47.38% solids, pH 7.53, average particle size 159 nm (BI90 plus), and pH 7.42.

Emulsion 14

The same process as in making Emulsion 4 was followed except that DALPAD A was used in place of SURFYNOL 104. QA Data: 49.57%% solids, average particle size 173 nm (BI90 plus), and pH 7.37.

Emulsion 15

The same process as in making Emulsion 4 was followed except that OPTIFILM 400 was used in place of SURFYNOL 104. QA Data: 49.75% solids; average particle size 126 nm (BI90 plus), and pH 7.17.

Emulsion 16

The same process as in making Emulsion 4 was followed except that COASOL was used in place of SURFYNOL 104. QA Data: 49.67% solids; average particle size 193 nm (BI90 plus), and pH 7.13.

Emulsion 17

The same process as in making Emulsion 4 was followed except that TEXANOL was used in place of SURFYNOL 104 and the stage 2 copolymer Tg was reduced from 17 to 11° C. QA Data: 48.85% solids, average particle size 190 nm (BI90 plus), and pH 7.12.

Emulsion 18

The same process as in making Emulsion 4 was followed except that TRITON X-15 was used in place of SURFYNOL 104. QA Data: 49.68% solids, and average particle size 150 nm (BI90 plus).

Emulsion 19

The same process as in making Emulsion 4 was followed except that TEXANOL was used in place of SURFYNOL 104 and the stage 2 copolymer tg was reduced from 17 to 6° C. QA Data: 48.29% solids; average particle size 194 nm (BI90 plus); and pH 7.29.

Emulsion 13A

At ambient temperature, 450 gm of DI water was added to a 5-L, 4-neck round bottom flask equipped with a mechanical stirrer, thermocouple, condenser and a stainless steel diptube and was warmed to 70° C. When the flask reached 70° C., ME1, as shown in Table 2.9, below, was transferred via FMI pump (QG 150) into the flask over ~15 minutes. After ME1 had been transferred, an additional 35 gm DI water rinse was added. With the reactor temperature at 40° C., three aqueous solutions composed of sodium sulfoxylate formaldehyde (SSF), tert-butylhydroperoxide (tBHP) and ferrous sulfate heptahydrate were charged sequentially to the flask. An exothermic reaction was observed within 2-3 minutes gradually increasing to 70° C. over 15 minutes. After the temperature peaked, two aqueous chaser solutions composed of tBHP and SSF were added sequentially to the flask to reduce residual monomer. After 10 minutes, an aliquot was taken and analyzed for average particle size 243 nm (BI90 plus), 62 ppm MMA and Mw 8704 with a Mn 5347. The resulting latex was next treated with a neutralizer solution resulting in a 5° C. temperature increase. A slightly soluble copolymer with a semi-transparent solution and a pH 11 was generated.

TABLE 2.9

| Stage 1 Materials | | | | | | | | | | |
|---|---|---|---|---|---|---|---|---|---|---|
| ME1 | | | | | | | | | Wt (gm) | |
| DI water | | | | | | | | | 244 | |
| EDTA, tetrasodium salt | | | | | | | | | 0.29 | |
| NaDBS | | | | | | | | | 0.76 | |
| TEXANOL | | | | | | | | | 20.0 | |
| MMA | | | | | | | | | 157.0 | |
| ALMA | | | | | | | | | 3.05 | |
| MAA | | | | | | | | | 40.0 | |
| MMP | | | | | | | | | 6.99 | |
| Activator | Wt (gm) | Initiator | Wt (gm) | Promoter | Wt (gm) | Chase Activator | Wt (gm) | Chase Initiator | Wt (gm) | Neutralizer (Stage 1) | Wt (gm) |
| SSF DI water | 2.54 26 | tBHP DI water | 3.94 20 | $FeSO_4$—$7H_2O$ DI water | 0.023 10 | SSF DI water | 0.44 19 | tBHP DI water | 0.63 10 | DI water sodium hydroxide (50% water) calcium hydroxide | 104 24.2 11.5 |

After 30 minutes, an initiator solution as shown in Table 2.10, below, was added into the flask followed by the gradual addition of ME2, the cofeed initiator and the cofeed activator solutions at 26.0, 1.33 and 1.33 g/min, respectively. Total feed time was 90 minutes and the reaction temperature was maintained between 63-67° C. After 80% of ME2 had been fed, 8.48 gm of ALMA was added shot to ME2. Then 35 gm of DI water was used to rinse the ME2 into the flask and 10 gm of DI water was used to rinse the cofeed solutions into the flask. The latex was maintained between 64-66° C. for 10 minutes. Aqueous solutions of tBHP and SSF were separately fed to the latex over 20 minutes while cooling the latex to 50° C. At 50° C., 111.2 gm of a 25% aqueous solution of MOWIOL 4-88 was added followed by the addition of a biocide (ROCIMA BT2S) to the latex. The latex was then isolated and analyzed: 48.67%% Solids; 174 nm average particle size (BI90 plus), 3 ppm MMA, 344 ppm BA, 286 cps (LV#3; 60 rpm) and Mw of 494,210 with a Mn 69,251.

gradually increasing to 86° C. over 15 minutes. After the temperature peaked, two aqueous solutions composed of tBHP and SSF were charged sequentially o the flask to reduce residual monomer. After 10 minutes, an aliquot was taken and analyzed for average particle size 352 nm (BI90 plus), 103 ppm MMA and pH 2.21. The resulting latex was treated with an aqueous solution of sodium hydroxide and calcium hydroxide resulting in a 3° C. temperature increase. The resulting solution had a pH 11 and the slightly soluble copolymer afforded a semi-transparent solution. To form the second stage, after 30 minutes, an initiator solution, shown in Table 2.11, below, was added followed by gradual addition of ME2 and the cofeed initiator solution at 10.5 and 0.5 g/min, respectively. Total feed time was 240 minutes and the reaction temperature was maintained between 84-86° C. After 80 wt. % of ME2 had been fed, 8.48 gm of allyl methacrylate (ALMA) was added to ME2. After these feeds were completed, 35 gm of DI Water was used to rinse the ME2 to the

TABLE 2.10

Stage Two Materials

| ME2 | Wt (gm) | Initiator | Wt (gm) | Cofeed Initiator Solution | Wt (gm) | Cofeed Activator Solution | Wt (gm) |
|---|---|---|---|---|---|---|---|
| DI water | 500 | APS | 3.00 | APS | 4.69 | sodium metabisulfite (NaMBS) | 9.25 |
| MOWIOL 4-88 solution (25%) | 111.8 | DI water | 35 | DI water | 121 | | |
| SLS | 13.0 | | | | | DI water | 121 |
| BA | 1030.7 | | | | | | |
| MMA | 672.7 | | | | | | |

Emulsion 14A

At ambient temperature, 428 gm of DI water was added to a 5-L, 4-neck round bottom flask equipped with a mechanical stirrer, thermocouple, condenser and a stainless steel diptube and was warmed to 85° C. ME1, shown in Table 2.11, below, was transferred with a FMI pump (QG 150) over ~15 minutes. An additional 35 gm DI water rinse was added to rinse the ME1 feed line. With the flask temperature at 48° C., three aqueous solutions composed of sodium sulfoxylate formaldehyde (SSF), tert-butylhydroperoxide (tBHP) and ferrous sulfate heptahydrate were charged sequentially to the flask. An exothermic reaction was observed within 2-3 minutes flask and 10 gm of DI water was used to rinse the cofeed initiator to the flask. The latex was maintained between 80-85° C. for 30 minutes. While these rinses were being fed to the flask, the latex was cooled to 75° C. Aqueous solutions of tBHP and SSF were fed separately with a standard dual syringe pump (Cole-Palmer Instruments, Vernon Hill, Vt.) to the flask over 20 minutes while cooling the latex to 50° C. At 50° C., 111.2 gm of a 25% aqueous solution of Mowiol 4-88 was added followed by the addition of a biocide (ROCIMA BT2S) to the latex. The latex was then isolated and analyzed: 48.78% % Solids; pH 7.07: 176 nm average particle size (BI90 plus), 2 ppm MMA, 74 ppm BA, 6 ppm STY and Mw of 430,670 with a Mn 156,880.

TABLE 2.11

Stage One Mixtures

| ME1 | Wt (gm) | Activator | Wt (gm) | Initiator | Wt (gm) | Promoter | Wt (gm) | Chase Activator | Wt (gm) | Chase Initiator | Wt (gm) | Neutralizer (Stage 1) | Wt (gm) |
|---|---|---|---|---|---|---|---|---|---|---|---|---|---|
| DI water | 376 | SSF | 3.91 | tBHP | 6.06 | FeSO4—7H$_2$O | 0.023 | SSF | 0.63 | tBHP | 0.44 | DI water | 146 |
| EDTA, tetrasodium salt | 0.045 | DI water | 37 | DI water | 28 | DI water | 10 | DI water | 10 | DI water | 19 | sodium hydroxide (50% water) | 37.2 |
| NaDBS | 1.17 | | | | | | | | | | | calcium hydroxide | 17.6 |
| TEXANOL | 30.8 | | | | | | | | | | | | |
| MMA | 241.5 | | | | | | | | | | | | |
| ALMA | 4.69 | | | | | | | | | | | | |
| MAA | 61.6 | | | | | | | | | | | | |
| MMP | 10.75 | | | | | | | | | | | | |

Stage Two Mixtures

| ME2 | Wt (gm) | Initiator | Wt (gm) | Cofeed Initiator Solution | Wt (gm) |
|---|---|---|---|---|---|
| DI water | 500 | APS | 3.00 | APS | 9.00 |
| MOWIOL 4-88 solution (25%) | 111.2 | DI water | 25 | DI water | 121 |

TABLE 2.11-continued

| | |
|---|---|
| SLS | 12.3 |
| BA | 1099.1 |
| styrene (STY) | 338.1 |
| MMA | 253.6 |

Emulsion 15A

The same process as in making Emulsion 4 was followed except that An equal wt of TEXANOL was used in place of SURFYNOL 104 for ME1 as shown in Table 2.7. At ambient temperature, 473 gm of DI water was added to a 5-L, 4-neck round bottom flask equipped with a mechanical stirrer, thermocouple, condenser and a stainless steel diptube. At ambient temperature, ME1, as shown in Table 2.7, below, was transferred to the flask over ~15 minutes. After ME1 had been transferred, the stage 1 activator was dissolved in 32 g $H_2O$, the stage 1 initiator was dissolved in 23 g $H_2O$, the stage 1 promoter was dissolved in 10 g $H_2O$, the stage 1 chase activator was dissolved in 19 g $H_2O$, the stage 1 chase initiator was dissolved in 10 g $H_2O$, the stage 1 neutralizer used was 122 g di water, 36.9 g sodium hydroxide (50% water) and 17.5 g calcium hydroxide; and the stage 2 copolymer tg was reduced from 17 to 6° C. in a redox initiated stage 2 polymerization process, as shown in Table 2.12, below, at a 65° C. reaction temperature. QA Data: 47.45% solids; average particle size 135 nm (BI90 plus), and pH 7.3.

TABLE 2.12

Stage Two Materials

| ME2 | Wt (gm) | Initiator | Wt (gm | Cofeed Initiator Solution | Wt (gm | Cofeed Activator Solution | Wt (gm) |
|---|---|---|---|---|---|---|---|
| DI water | 620.9 | APS | 2.23 | APS | 10.49 | sodium metabisulfite (NaMBS) | 15.95 |
| MOWIOL 4-88 solution (25%) | 111.8 | DI water | 28 | DI water | 120 | | |
| SLS | 12.2 | | | | | DI water | 120 |
| BA | 1018.0 | | | | | | |
| MMA | 668.4 | | | | | | |

TABLE 3

| Temperature | | | | Anti-Caking |
|---|---|---|---|---|
| Inlet | Outlet | Air Flow | Latex | Aid |
| 170-180° C. | 62-64° C. | 6.0-6.2 kg/cm² | 55-65 gm/min | 2.9-3.5 gm/min |

Examples 1-6

Effect of Colloidal Stabilizer in Polymerization

The Emulsions in Table 4, below, were spray dried with an anti-caking agent (ACA) as indicated. Each powder product was analyzed for residual moisture content (% $H_2O$) using a Denver Instruments IR 35 Moisture Analyzer (Bohemia, N.Y.) and particle size distribution using a Beckman Coulter LS 13 320 (Danvers, Mass.) via laser diffraction to measure the particle size of the powder. An acceptable particle size is dependent on the nozzle type used to spray dry the powder, residence time in the dryer and degree of agglomeration that may occur. For these examples, the powder particle size is low due to the short residence time in the dryer (<10 sec). Each of Water Redispersible Polymer Powder Formation Via Spray Drying At ambient temperature, 1000 gm of the Emulsions indicated in the Tables 4 and 5, below, were treated with an aqueous slurry composed of 6.25 gm of calcium hydroxide and 365 gm of water to give an emulsion having a pH 10-11 and a solids content of ~35%. The neutralized emulsion was then spray dried using a Niro Atomizer Spray Dryer (GEA Process Engineering Inc, Columbia, Md.) laboratory spray dryer equipped with a nozzle (SU4 or SU5 from Spray Systems Company, Wheaton, Ill.). Unless otherwise indicated, no additional colloidal stabilizer was used. Spray drying conditions, with tolerances for uncertainty were as shown in Table 3, below. Unless specified, an anti-caking aid was not used for all examples. The resulting free-flowing powders were recovered in 80-90% recovery in the manner defined below.

the resulting dispersions was evaluated for recovery and redispersibility by resistance to sedimentation in the following manner:

Recovery:

(Recovery indicates the percent of powder recovered vs. the total amount of dry polymer, anti-caking aid and protective colloid spray dried. An acceptable level of recovery is >80 wt. % of the total weight of solids put into the dryer, and, preferably, 90 wt. % but it is dependent on cyclone efficiency.

Sedimentation:

(Each powder was redispersed by mixing 50 gm equal weight of powder and water for 30 minutes using a standard stainless steel agitator and an IKW RW 20 Digital Stirrer (Wilmington, N.C.) at 400 rpm. The resulting paste was let down with additional water, 1 part paste to 90 parts water. Sedimentation indicates the dispersion stability of the aqueous redispersed powder where optimum sedimentation is 0 mm after 24 hours. Sedimentation is conducted using a 0.5 mm diameter×45 cm in length burette modified with a flat base containing graduation in mm vs mL. An acceptable level of sedimentation is ≤20 mm, preferably, ≤10 mm. An alternative method to measure powder redispersibility is to analyze the redispersed powder with a Beckman-Coulter LS 13 320 Laser Diffraction Particle Analyzer equipped with a ALM module. For this method, an acceptable powder redispersibility is defined by the % of particles having a particle size than 5 µm and, preferably, less than 1 micron. This definition is dependent on the primary particle of the initial dispersion spray dried. For example, if an initial dispersion has a particle size of 1 micron, then the acceptable powder redispersibility may be % particle having a particle size <10 µm.

As shown in Table 4, the multi-stage acrylic copolymer Examples 2, 5, and 6 with in process (used during polymerization) colloidal stabilizers all gave an acceptable redispersibility of 2 mm or less sedimentation after 24 hours. Example 3, with no in process colloidal stabilizer exhibited unacceptable redispersibility.

TABLE 4

Effect of Colloidal Stabilizers on Redispersibility

| Example | Emulsion | Recovery | wt. % H₂O | % ACA | Particle Size (µm) | Sedimentation |
|---|---|---|---|---|---|---|
| 1* | 1 | 93% | 2.01% | None | 21 µm | |
| 2 | 2 | | 2.59% | 12.41% Kaolin Clay | 13 µm | 20 mm 24 hr |
| 3* | 3 | 85% | 2.28% | 6.27% WINNOFIL-S | 17 µm | 34 mm 24 hr |
| 4* | 4* | 92% | 2.22% | 8.8% Kaolin Clay | | |
| 5 | 13A | 86% | 1.74% | 13.21% Kaolin Clay | 17 µm | 12 mm 24 hr |
| 6 | 14A | 86% | 2.07% | 12.15% Kaolin Clay | 14 µm | 16 mm 24 hr |

*Comparative

Examples 7-13

Negative Influence of Surfactants on Redispersibility

The following examples, shown in Table 5, below, were spray dried with kaolin clay as the anti-caking aid. Kaolin clay concentrations in the resulting powder averaged 10%. Each sample was analyzed for residual moisture content (% H₂O) and particle size distribution using Coulter LS 12 320. For each sample was redispersed by mixing equal weight of powder and water for 30 minutes. The resulting paste was let down with addition water (1 part past to 90 parts water). The redispersed powder was analyzed using a Beckman-Coulter LS 13 320 Laser Difraction Particle Sizer Analyzer as described above. The % particle having an average particle size less than 1 micron were determined.

As shown, in Table 5, below, the water redispersible powders having only surfactants in process (polymerization) gave poor to bad redispersibility. The water redispersible powder of Example 12 used an ethyleneglycol octylphenyl ether as a nucleating agent and demonstrated dramatically improved redispersibility.

TABLE 5

Surfactant Effect on Redispersibility

| Example | Emulsion | Surfactant | % H₂O | Cloudpoint (° C.) | HLB | % Particles <1 µm |
|---|---|---|---|---|---|---|
| 7* | 5* | TRITON X-405 | 1.77% | >100 | 17.6 | 0% |
| 8* | 6* | PLURONIC L-31 | 1.61% | 31 | 7 | 14% |
| 9* | 7* | TRITON CF-10 | 1.72% | 28 | 12.6 | 29% |
| 10* | 9* | TRITON X-100 | 1.51% | 66 | 13.4 | 42% |
| 11* | 1* | SURFYNOL 104 | 1.51% | Insoluble | 4 | 63% |
| 12 | 8 | TRITON X-15[1] | 1.57% | Insoluble | 1.5 | 100% |

*Comparative;
[1]Nucleating Agent - poor surfactant.

Examples 13-29

Effect of Nucleating Agent on Redispersibility

The following powders were spray dried as described above in Table 3 and the accompanying text, except with no anti-caking agent. Each aqueous powder dispersion was prepared by mixing 2 parts RDP with 3 parts water for 20 minutes using a standard stainless steel agitator. The measured MFFT values are presented in Table 6, below. Where aging is indicated, the water redispersible polymer powder was subject to ambient conditions for a specified time. Minimum film formation temperatures (MFFT) and sedimentation were measured. MFFT Visual values were obtained using a Minimum Film Formation Temperature Tester SS-3000 (Sheen Instruments, Surrey, England); Standards: DIN 53787-DIN 53 366-ASTM D 2354-ASTM D 1465-ISO 2115-ISO/DIS 4622. The preferred MFFT value is less than 5° C. and, preferably 0° C. or less. MFFT Mechanical values were obtained by removing the film and visually determining the temperature where the film cracked.

As shown in Table 6, below, all inventive examples gave good sedimentation results and reduced minimum film forming temperature significantly to a preferred temperature of less than 10° C. Comparative Example 13, which contained only surfactants gave inadequate sedimentation results and resulted in a minimum film forming temperature outside the acceptable range. Example 18 contained excessive amounts of water and used amounts of nucleating agents which limited redispersibility to less than an acceptable level.

TABLE 6

Effect of Nucleating Agent on Film Formation and Redispersibility of Powders

| Ex. | Emulsion | Tg (° C.) | Nucleating Agent | wt. % H₂O | MFFT Visual | MFFT Mechanical | Sediment |
|---|---|---|---|---|---|---|---|
| 13* | 13 | 22 | None (1.6% PLURONIC L-31) | 2.37% | 10.5° C. | >18.0° C. | 5 mm 1 hr 36 mm 24 hr |
| 14 | 10 | 17 | 1.5% TEXANOL | 3.00% | 6.8° C. | >18.0° C. | 0 mm 1 hr 10 mm 24 hr |
| 15 | 10 | 17 | 1.5% TEXANOL (aged 4 months) | | 7.2° C. | >18.0° C. | |
| 16 | 11 | 17 | 3.1% TEXANOL | 2.30% | 3.7° C. | 14.4° C. | 1 mm 1 hr 15 mm 24 hr |
| 17 | 11 | 17 | 3.1% TEXANOL (aged 4 months) | | 3.4° C. | 13.2° C. | |
| 18 | 12 | 17 | 4.5% TEXANOL | 4.26% | 1.0 C. | >18.0° C. | 3 mm 1 hr 30 mm 24 hr |
| 19 | 12 | 17 | 4.5% TEXANOL (aged 4 months) | | 1.9 C. | >18.0° C. | |
| 20 | 14 | 17 | 1.5% DALPAD A | 3.21% | 7.2° C. | >18.0° C. | 5 mm 1 hr 13 mm 24 hr |
| 21 | 15 | 17 | 1.5% OPTIFILM 400 | 2.83% | 8.5° C. | 13.3° C. | 1 mm 1 hr 10 mm 24 hr |
| 22 | 16 | 17 | 1.5% COASOL | 2.95% | 8.5° C. | 12.0° C. | 7 mm 1 hr 15 mm 24 hr |
| 23 | 17 | 17 | 1.5% TRITON X-15 | 2.40% | 9.8° C. | 14.4° C. | 3 mm 1 hr 13 mm 24 hr |
| 24 | 18 | 11 | 1.5% TRITON X-15 | 2.72% | 0° C. | 8.8° C. | 1 mm 1 hr 17 mm 24 hr |
| 25 | 17 | 11 | 1.5% TEXANOL | 2.69% | 0° C. | 9.3° C. | 3 mm 1 hr 13 mm 24 hr |
| 26 | 17 | 11 | 1.5% TEXANOL | 2.39% | 0.5° C. | 12.7° C. | 2 mm 1 hr 15 mm 24 hr |
| 27 | 17 | 11 | 1.5% TEXANOL (4 months) | | 0° C. | 10.7° C. | |
| 28 | 19 | 6 | 1.5% TEXANOL | 2.66% | 0° C. | 8.3° C. | 0 mm 1 hr 10 mm 24 hr |
| 29 | 15A | 6 | 1.5% TEXANOL | 2.68% | 0° C. | 11.2° C. | 0 mm 1 hr 14 mm 24 hr |

Determination of Residual Nucleating Agent Concentration:

The nucleating agent concentration of each of Emulsions 11 and 15A and its corresponding water redispersible polymer powder was measured with headspace Gas Chromagraphy analysis (GCD) (Pyrolysis-GC analysis using a Frontier py-2020iD double shot pyrolyzer, Frontier labs, Fukushima, JP; and an Agilent 6890 GC equipped with a 5973 MSD RTX-5 column, Agilent Technologies, Santa Clara, Calif. Length: 30 m, Diameter: 0.25 mm, Film Thickness: 0.25 μm). The nucleating agent (TEXANOL) concentration of the RDP final product was fully conserved, even after each corresponding water redispersible polymer powder was heat aged at 60° C. for two weeks. Each sample was analyzed three times to confirm reproducibility.

Example 31

Cement Tile Adhesive (CTA) Applications

As Indicated in Table 7, below, the indicated emulsion and, separately, an anti-caking agent were each pumped (two inlets) into a rotary atomizer equipped on a pilot scale spray dryer (Bowen BLSA Spray Dryer, GEA Process Engineering Inc, Columbia, Md.). The air pressure to the nozzle may be fixed at 1 bar with 50% flow which is equivalent to 6 kg/hr of airflow. The spray drying was conducted in an $N_2$ environment with an inlet temperature fixed at 140° C., and the outlet temperature targeted to 50° C.±1° C. by tuning the feed rate of the mixture and spray drying to obtain a redispersible polymer powder. The RDP from Emulsion 2 was formulated into the Example 30 and 31 redispersible powders, shown in Table 8, below. Each tile adhesive formulation shown in Table 8, below, was weighed and placed into a plastic bag and hand mixed for 2 minutes and conditioned in constant temperature (21° C.-25° C.) and humidity (45-55% relative humidity) conditions for 24 hrs. The resulting products were then tested. Included were a standard dry mix formulation in Examples 30, 32 and 34 as well as a dry mix formulation containing an alumina rich cement comprising ordinary Portland Cement (OPC), calcium aluminate cement (CAC) and calcium sulfate in the remaining Examples.

TABLE 7

RDP Spray Dry Formulations

|  | Emulsion X[1] | Emulsion Y[2] | Emulsion 2 |
|---|---|---|---|
| Shell stage (wt. % as % total monomers) | 20 | 15 | 15 |
| Core Tg (° C.) | 22 | 17 | 17 |
| (wt. % carboxyl group containing monomer) | 4.0 | 3.1 | 3.1 |
| Average particle size (nm) (BI 90 Plus) | 102 | 155 | 169 |
| Process | 2 stage redox/thermal | 2 stage redox/thermal | 2 stage redox/thermal |
| Polymerization Temperature | 86 | 86 | 86 |
| Nucleating Agent (wt. % of core stage polymer solids) | None (2.5% PLURONIC L31) | None (1.55% SURFYNOL 104) | 1.55% TRITON X-15 |
| PVOH (wt. %) in polymerization | None | 2.5[3] | 2.5 |
| Defoamer Additive | calcium hydroxide | calcium hydroxide | calcium hydroxide |

TABLE 7-continued

RDP Spray Dry Formulations

|  | Emulsion X[1] | Emulsion Y[2] | Emulsion 2 |
|---|---|---|---|
| Anti-caking agent | 4% WINNOFIL-S | 4% WINNOFIL-S | 12.5% kaolin clay |

[1]Spray dried using Knoxville, TN plant scale dryer;
[2]Spray dried using pilot scale spray dryer (Bowen BLSA Spray Dryer, GEA Process Engineering Inc, Columbia, MD (Inlet Temp 121° C.; Outlet Temperature 60° C.; Feed Solids: 30% (latex diluted with water); Latex Feed Rate: 18.18 Kg/hr; Rotary Atomizer Speed: 42 rpm; Flow Aid Feed Rate: 12 gm/min (WINNOFIL-S)

Test Methods:

The cement tile adhesives were tested as follows:

Density:

Mortars are placed into a container of known volume, tamped down by tapping the container on the bench top and then weighed.

Mortar Viscosity:

Viscosities are measured with a Brookfield Synchro-lectric viscometer (Model RVT) in combination with a Brookfield Helipath stand at 25° C. The mortar is filled into a density cup and the spindle (T-F) is positioned such that it just touches the surface of the mortar. The spindle of the viscometer rotates for 2 minutes with 5 rpm. During the rotation the viscometer is moved up and down so that its rotating spindle describes a helical path through the sample. The first measurement is not taken until the spindle is fully submerged after one full rotation. Four readings are measured as the viscometer moves in each direction, the average of which is reported.

Set Time:

Set time was measured according to ASTM C191 (2008, West Conshohocken, Pa.). Mortar is placed into the circular set time molds which are then covered with a layer of plastic held in place by a rubber band. These are then placed into position under the Vicat needles. Initial set time and final set time are measured according to the distance the needle can penetrate into the mortar.

Shear Strength:

Plywood shear strength was measured according to ANSI 118.11 sections 4.1.1 and 4.1.2. Samples are assembled with a mortar layer bonding one piece of plywood and one piece of quarry tile together. Shear strength is measured after samples are aged for 7 days and 28 days. Impervious ceramic mosaic shear strength was measured according to ANSI 118.4, sections 5.2.2, 5.2.3, and 5.2.4 (TCNA, 2011) Samples were assembled with a mortar layer bonding two pieces of impervious ceramic mosaic tile together. Shear strength was also measured after samples are aged (in constant temperature (21° C.-25° C.) and humidity (45-55% relative humidity conditions) for 7 days (ANSI 118.4, section 5.2.2), 7 days followed by immersion in water for an additional 7 days (ANSI 118.4, section 5.2.3), and 28 days (ANSI 118.4, section 5.2.4). These ANSI test standards used for shear strength testing are summarized below:

| Shear Strength Test Standard | ANSI Test |
|---|---|
| Impervious Ceramic Mosaic Tile, 7day | 118.4, 5.2.2 |
| Impervious Ceramic Mosaic Tile, 7 day water immersion | 118.4, 5.2.3 |
| Impervious Ceramic Mosaic Tile, 28 day | 118.4, 5.2.4 |
| Plywood, 7 day | 118.11, 4.1.1 |
| Plywood, 28 day | 118.11, 4.1.2 |

TABLE 8

Cement Tile Adhesive Formulations

| RAW MATERIAL | Example (wt. %) | | | | | |
|---|---|---|---|---|---|---|
| | 30* | 31 | 32* | 33* | 34* | 35* |
| Portland Cement Type I (OPC) | 35 | 31 | 35 | 31 | 35 | 31 |
| TERNAL W (CAC) | | 4 | | 4 | | 4 |
| Sand F-80, Silica Sand | 58.68 | 56.38 | 58.68 | 56.38 | 58.68 | 56.38 |
| Lithium Carbonate | | 0.1 | | 0.1 | | 0.1 |
| Tartaric Acid | | 0.2 | | 0.2 | | 0.2 |
| Calcium Sulfate | | 2 | | 2 | | 2 |
| Emulsion 2 | 6 | 6 | | | | |
| Mowinyl ™ Powder LDM 7000P*,[2] | | | 6 | 6 | | |
| Mowinyl ™ Powder LDM 7100P*,[3] | | | | | 6 | 6 |
| Hydroxyethyl methyl cellulose (HEMC)[1] | 0.32 | 0.32 | 0.32 | 0.32 | 0.32 | 0.32 |
| Total, % weight | 100 | 100 | 100 | 100 | 100 | 100 |
| Water:Powder Ratio by weight | 0.205 | 0.205 | 0.21 | 0.21 | 0.21 | 0.21 |

*Comparative;
[1] Thickener MKX 60000 PF01 (Dow Chemical) having a 60000 cps (Haake, 2.55 reciprocal seconds) viscosity in a 2 wt. % solution in water at room temperature;
[2] Acrylic ester polymer RDP with PVOH colloidal stabilizer: solid content - 99%, apparent density - 450 g/l, ash content - 9.5%, Tg of ~8 deg C., minimum film formation temperature of ~0 deg C., and content of grains larger than 300 μm - <3% (Nippon Gohsei, Tokyo, JP);
[3] Same polymer as in 2, however it is cationic (Nippon Gohsei, Tokyo, JP).

As shown in Table 9, below, the inventive carboxyl group containing multi-stage acrylic copolymer Emulsion 2 in inventive Example 31 exhibited the highest water immersion shear strength when formulated in an alumina rich cement. Its value was higher than all the other samples, even though was expected to exhibit similar water immersion values to the remaining Examples. Further, Example 31 exhibited the highest % strength retention after water immersion. Also, the large magnitude of the difference (>10 hrs.) in set time in a OPC+CAC+calcium sulfate mixture in Example 31 versus an OPC system (Example 30) was very surprising. All comparative Examples 33 and 35 exhibited a slower set time in the OPC+CAC+calcium sulfate mixture versus comparative Examples 32 and 34 in the OPC system.

TABLE 9

Properties of Cement Tile Adhesive (CTA) Formulations

| TEST | Example (wt. %) | | | | | |
|---|---|---|---|---|---|---|
| | 30* | 31 | 32* | 33* | 34* | 35* |
| Brookfield mortar viscosity 5 RPM (cps) | 533750 | 508750 | 486250 | 481250 | 503750 | 522500 |
| Vicat set time, initial (hrs.) | 21.1 | 10.5 | 14.6 | 18.1 | 15.1 | 21.8 |
| Vicat set time, final (hrs.) | 28.8 | 22.9 | 19.5 | 26.9 | 20.4 | 30.0 |
| Shear Strength, Impervious Ceramic Mosaic Tile: | | | | | | |
| 7 day (MPa), Average | 2.71 | 2.65 | 2.91 | 2.52 | 2.97 | 2.56 |
| 7 day (MPa), Standard Deviation | 0.27 | 0.15 | 0.29 | 0.20 | 0.18 | 0.20 |
| 7 day water immersion (MPa), Average | 1.67 | 2.28 | 1.86 | 1.88 | 1.81 | 1.84 |
| 7 day water immersion (MPa), Standard Deviation | 0.17 | 0.19 | 0.23 | 0.10 | 0.18 | 0.19 |
| Strength Retention After Water Immersion (%) | 62 | 86 | 64 | 75 | 61 | 72 |

We claim:

1. A water redispersible polymer powder composition comprising a carboxyl group containing multi-stage acrylic copolymer having an alkali-soluble resin outer stage and one or more inner stage, one or more nucleating agent having a boiling point of 150° C. to 500° C., and a water solubility of 3.5% or less, and one or more colloidal stabilizer, wherein when dispersed in water the one or more inner stage comprises an acrylic (co)polymer having a glass transition temperature (Tg) of from −40 to 50° C.

2. The composition as claimed in claim 1, wherein the one or more nucleating agent has a water solubility of 1.0% or less.

3. The composition as claimed in claim 1, wherein the total amount of colloidal stabilizer ranges from 0.1 to 30 wt. %, based on the total weight of the composition and the total amount of nucleating agent in the multi-stage acrylic copolymer ranges from 0.1 to 4.0 wt. %, based on the total polymer solids.

4. The composition as claimed in claim 1, wherein the one or more colloidal stabilizer comprises a polyvinyl alcohol (PVOH).

5. The composition as claimed in claim 1, further comprising one or more anti-caking agent such that the total amount of the anti-caking agent ranges from 3.0 to 30 wt. %, based on the total weight of the water redispersible polymer composition.

6. The composition as claimed in claim 1, wherein the one or more nucleating agent is chosen from $C_3$ to $C_{10}$ alkyl glycol ethers; phenyl glycol ethers; $C_3$ to $C_{10}$ alkyl diglycol ethers; $C_3$ to $C_{10}$ alkylaryl glycol ethers; $C_3$ to $C_{10}$ alkylaryl diglycol ethers; $C_3$ to $C_{10}$ alkyl esters of $C_3$ to $C_9$ alkanoic acids; $C_3$ to $C_{10}$ alkyl esters of $C_3$ to $C_9$ alkanedioic acids; $C_3$ to $C_{10}$ alkyl diesters of $C_3$ to $C_9$ alkanoic acids; $C_3$ to $C_{10}$ dialkyl esters of $C_3$ to $C_9$ alkanedioic acids; and mixtures thereof.

7. The composition as claimed in claim 6, wherein the nucleating agent is chosen from an alkyl isobutyrate and a branched alkyl isobutyrate.

8. The composition as claimed in claim 1, wherein the carboxyl group containing multi-stage acrylic copolymer comprises in copolymerized form from 0.1 to 20 wt. %, based on the total weight of the monomers used to make the copolymer, of one or more carboxyl group containing monomer.

9. A dry mix cement tile adhesive composition comprising the water redispersible polymer powder as claimed in claim 1, an ordinary Portland cement, an alumina rich cement with an alumina content of from 30 wt. % to 85 wt. %, and calcium sulfate.

10. The dry mix composition as claimed in claim 9, wherein the average particle size of the carboxyl group containing acrylic water redispersible polymer is from 100 to 400 nm.

* * * * *